US012573974B2

(12) United States Patent
Grubic et al.

(10) Patent No.: US 12,573,974 B2
(45) Date of Patent: Mar. 10, 2026

(54) MITIGATION OF VEHICLE VIBRATIONS INDUCED BY DRIVE-LINE OSCILLATIONS

(71) Applicant: Canoo Technologies Inc., Torrance, CA (US)

(72) Inventors: Stefan Grubic, Redondo Beach, CA (US); Ernesto Inoa, Villa Rica, GA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 140 days.

(21) Appl. No.: 18/393,395

(22) Filed: Dec. 21, 2023

(65) Prior Publication Data

US 2025/0211151 A1      Jun. 26, 2025

(51) Int. Cl.
*H02P 23/04* (2006.01)
*B60L 15/20* (2006.01)

(52) U.S. Cl.
CPC .............. *H02P 23/04* (2013.01); *B60L 15/20* (2013.01); *B60L 2240/423* (2013.01)

(58) Field of Classification Search
CPC .... H02P 23/04; B60L 15/20; B60L 2240/423; B60L 2240/421; B60L 2270/145
USPC .................................................. 318/448, 445
See application file for complete search history.

(56) References Cited

U.S. PATENT DOCUMENTS 5,545,957 A      8/1996   Kubo et al.
6,196,345 B1    3/2001   Lyons et al.

7,190,134 B2 *   3/2007   Shibata ................... H02P 29/50
                                                                        318/400.23
11,228,268 B2 *  1/2022   Tsao ..................... H02P 23/0004
11,750,132 B2 *  9/2023   Wu ......................... H03H 17/02
                                                                        318/803
2003/0062859 A1   4/2003   Amann et al.
2012/0262102 A1  10/2012   Gee et al.

OTHER PUBLICATIONS

Templin, P., et al., "A Powertrain LQR-Torque Compensator with Backlash Handling", Oil & Gas Science and Technology—Rev. IFP Energies nouvelles, DOI: 10.2516/ogst/2011147, vol. 66, No. 4, Jul. 2011, 10 pages.
Bang, J., et al., "The Active Damping control to Reduce Driveline Oscillations for Electric Vehicles Using Wheel Speeds", SAE Technical Paper 2015-01-1113, DOI: 10.4271/2015-01-1113, Apr. 14, 2015, 5 pages.

* cited by examiner

*Primary Examiner* — David Luo
(74) *Attorney, Agent, or Firm* — ALLEN, DYER, DOPPELT, + GILCHRIST, P.A. Attorneys at Law

(57)                    ABSTRACT

An electric motor controller is equipped to mitigate drive line induced vehicle vibration. The motor speed is measured at the output of the motor, separately from any measurement of drive shaft or wheel speed. At least bandpass filtering is applied to the measured motor speed, at a pass band based on the natural frequency of the drive shaft. The filtering detects drive line induced oscillations of the motor speed. A controller uses the detected drive line induced oscillations to generate an oscillation control output, subject to limiting. An oscillation mitigation torque signal corresponding to the control output is added to a torque command for desired motor speed, to adjust for the oscillations. The adjusted torque command is used to control the motor, with a significant reduction in the oscillation of the motor's speed.

20 Claims, 8 Drawing Sheets

600

601

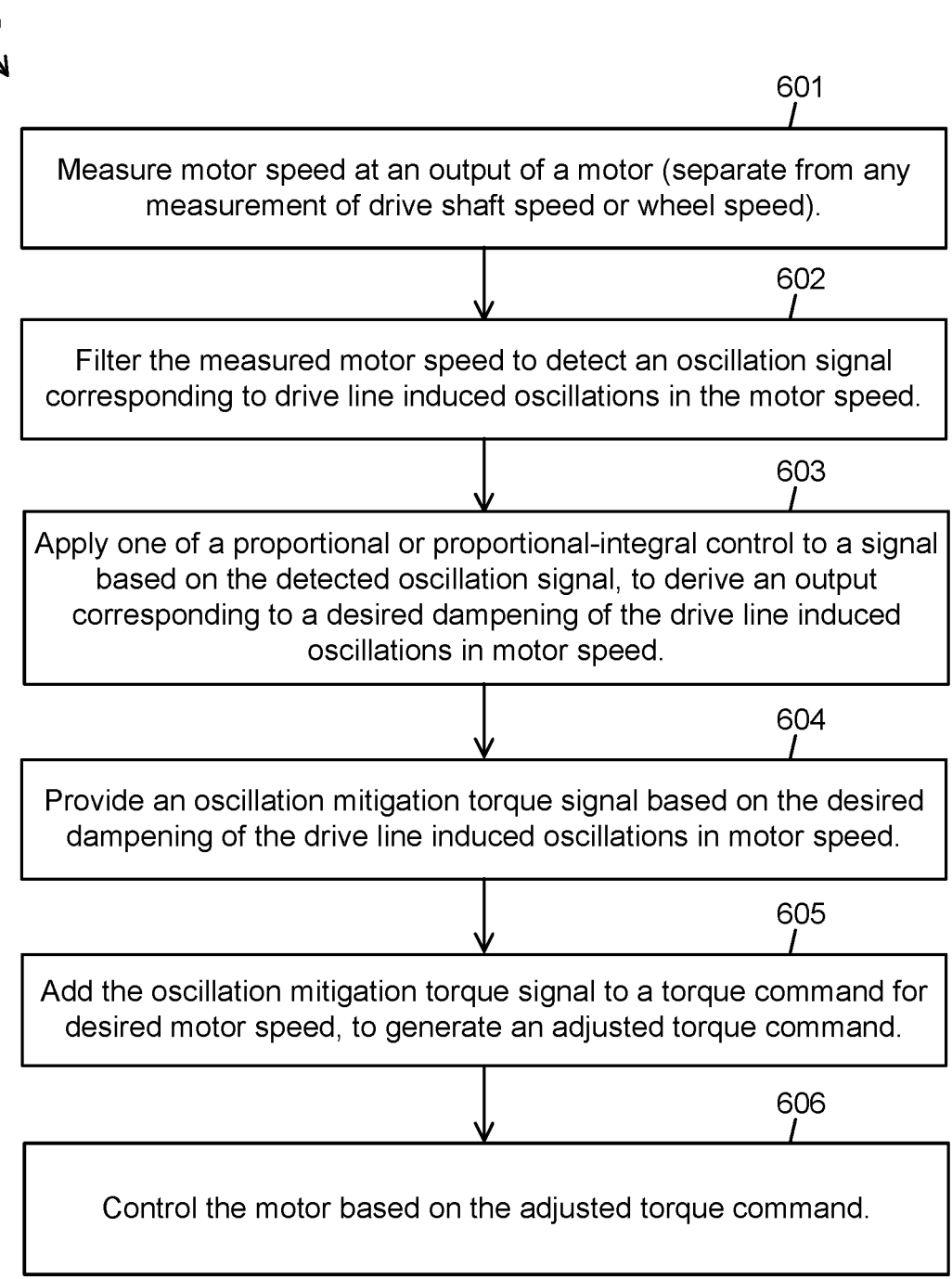

Measure motor speed at an output of a motor (separate from any measurement of drive shaft speed or wheel speed).

602

Filter the measured motor speed to detect an oscillation signal corresponding to drive line induced oscillations in the motor speed.

603

Apply one of a proportional or proportional-integral control to a signal based on the detected oscillation signal, to derive an output corresponding to a desired dampening of the drive line induced oscillations in motor speed.

604

Provide an oscillation mitigation torque signal based on the desired dampening of the drive line induced oscillations in motor speed.

605

Add the oscillation mitigation torque signal to a torque command for desired motor speed, to generate an adjusted torque command.

606

Control the motor based on the adjusted torque command.

FIG. 6

MITIGATION OF VEHICLE VIBRATIONS INDUCED BY DRIVE-LINE OSCILLATIONS

TECHNICAL FIELD

This disclosure relates generally to drive line induced judder. More specifically, this disclosure relates to mitigating drive line induced vibration by adding vibration-countering torque from the electrical motor.

BACKGROUND

The drive line of vehicles can be modelled as a torsional spring. When excited, the drive line can cause undesirable vehicle vibrations that are at least unpleasant for the driver and, in the worst case, may even damage mechanical components. The excitation usually happens when a change in torque is executed as a result of a request by the operator via the acceleration pedal or brake.

SUMMARY

This disclosure relates to mitigating drive line induced vibration by adding countering torque based on motor speed measurements.

An electric motor controller is equipped to mitigate drive line induced vehicle vibration. The motor speed is measured at the output of the motor, separately from any measurement of drive shaft or wheel speed. A bandpass filter and a highpass filter are applied to the measured motor speed, with the pass band centered on the natural frequency of the drive line assembly. The filtering isolates the drive line induced oscillations of the motor speed. A controller then uses the detected drive line induced oscillations to generate a control output, subject to limiting. The controller can, for example, be implemented as a proportional or a proportional-integral controller. An oscillation mitigation torque signal corresponding to the control output is added to a torque command to remove the oscillation from the motor speed. The adjusted torque command results in the elimination or a significant reduction in the motor speed oscillations.

In certain embodiments, a method includes measuring motor speed at an output of a motor. Measurement of the motor speed at the output of the motor is separate from any measurement of shaft speed or wheel speed. The measured motor speed is filtered to detect an oscillatory component corresponding to drive line induced oscillations in the motor speed. A control such as a proportional or proportional-integral is applied to a signal based on the detected oscillation signal, to derive an output corresponding to a desired dampening of the drive line induced oscillations in motor speed. An oscillation mitigation torque signal is provided based on the desired dampening of the drive line induced oscillations in motor speed. The oscillation mitigation torque signal is added to a torque command for desired motor speed, to generate an adjusted torque command, and the motor is controlled based on the adjusted torque command.

In certain embodiments, a system includes a sensor configured to measure motor speed at an output of a motor. Measurement of the motor speed at the output of the motor is separate from any measurement of shaft speed or wheel speed. The system also includes at least one filter configured to filter the measured motor speed to detect signals corresponding to drive line induced oscillations in the motor speed. The system further includes a controller configured to apply the output of a proportional, or proportional-integral, controller to a signal based on the detected oscillation signal, to derive an output corresponding to a desired dampening of the drive line induced oscillations in motor speed. The system still further includes a signal combiner configured to receive an oscillation mitigation torque signal based on the desired dampening of the drive line induced oscillations in motor speed, add the oscillation mitigation torque signal to a torque command for desired motor speed, to generate an adjusted torque command, and generate a control signal for controlling the motor based on the adjusted torque command.

In some embodiments, a proportional control may be employed to derive an output corresponding to a desired dampening of the drive line induced oscillations in motor speed.

In some embodiments, the output corresponding to the desired dampening of the drive line induced oscillations in motor speed may be limited to generate the oscillation mitigation torque signal.

In some embodiments, filtering the measured motor speed involves employing a bandpass filter having a pass band based on a natural drive shaft rotation frequency to filter the measured motor speed.

In some embodiments, a pass band for a bandpass filter employed to filter the measured motor speed is based on 8 Hertz.

In some embodiments, filtering the measured motor speed involves applying a high pass filter to the measured motor speed.

In some embodiments, an oscillation mitigation torque is determined by subtracting the oscillation signal from a target drive line oscillation.

In some embodiments, a target drive line oscillation is zero.

In some embodiments, the vehicle is an electric vehicle and the motor is an electric motor.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 6 is a high level flowchart for a process of mitigating drive line induced vehicle vibration in accordance with embodiments of the present disclosure.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Figure 1:
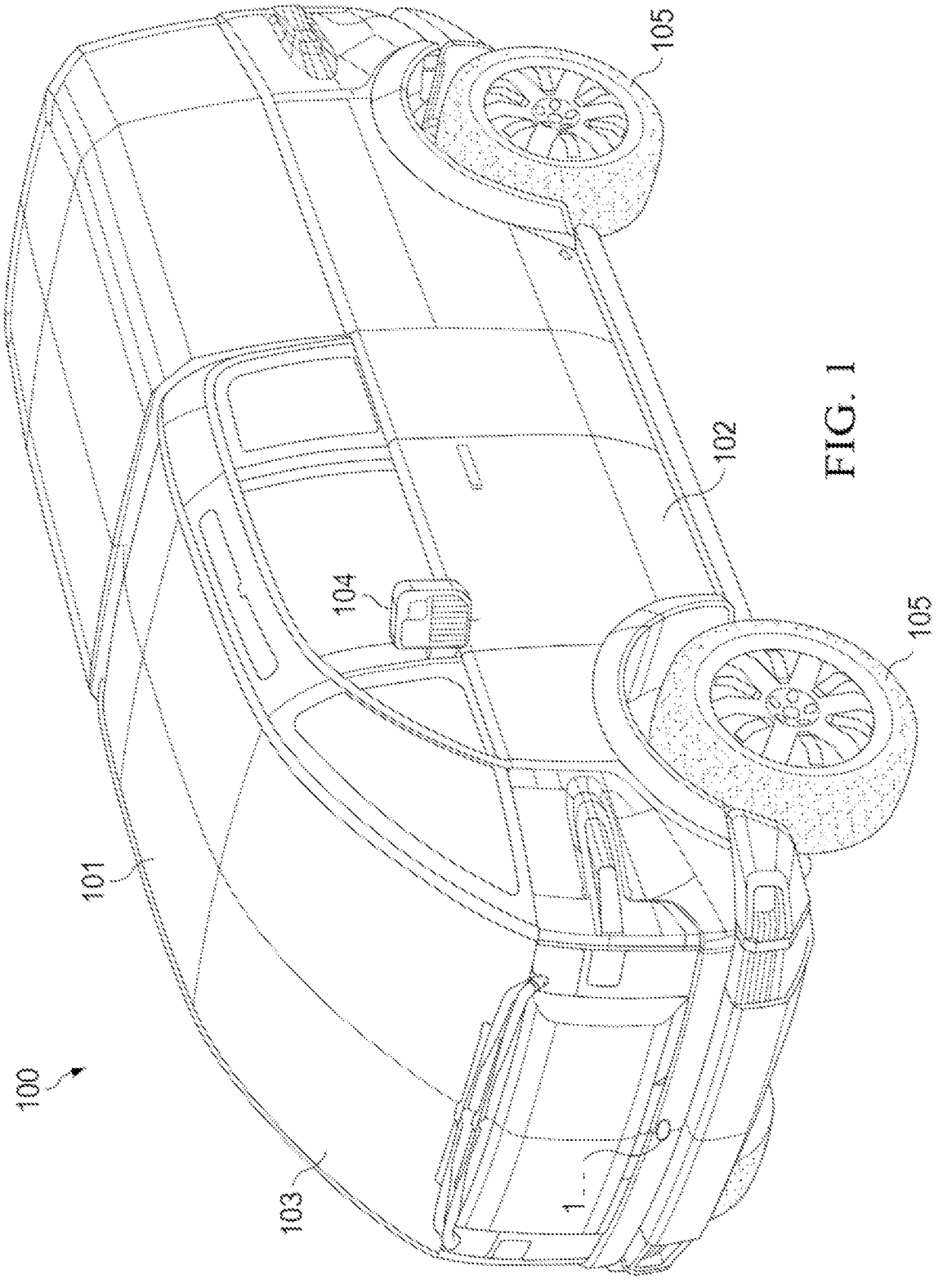
FIG. 1 is a perspective view of a vehicle within which mitigation of drive-line induced vibration is implemented in accordance with embodiments of the present disclosure.

FIG. 1 is a perspective view of a vehicle 100 within which mitigation of drive-line induced vibration is implemented in accordance with embodiments of the present disclosure. The embodiment of the vehicle illustrated in FIG. 1 is for illustration and explanation only. FIG. 1 does not limit the scope of this disclosure to any particular implementation.

The vehicle 100 of FIG. 1 includes a chassis (not visible in FIG. 1) supporting a cabin 101 for carrying at least one passenger (the operator). In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for blind spot warning and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes drive line induced vibration mitigation control as described below.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1.

Figure 2:
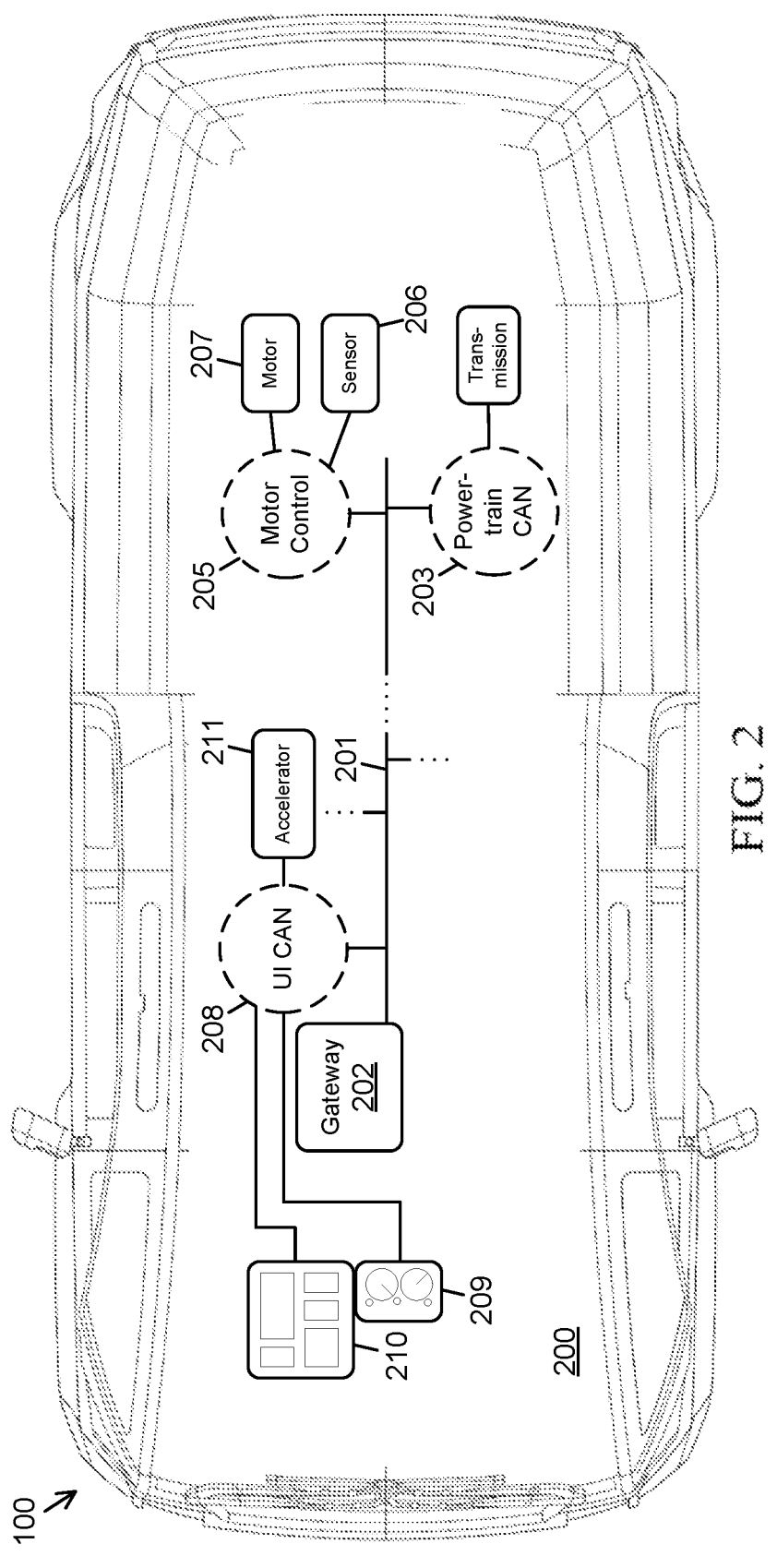
FIGS. 2 and 2A depict a vehicle control system for a vehicle within which mitigation of drive-line induced vibration is implemented in accordance with embodiments of the present disclosure.
Figures 2A, 3:
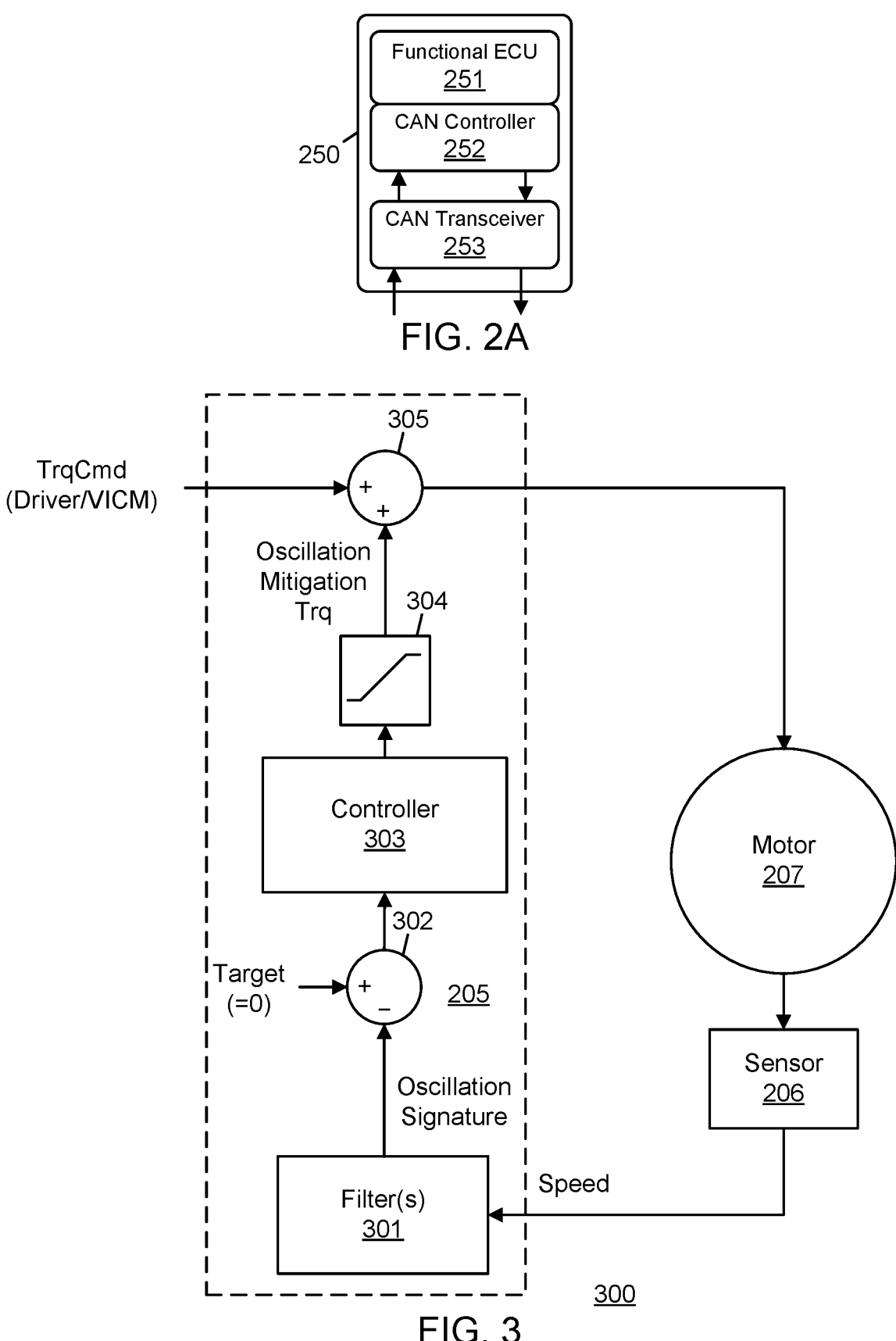
FIG. 3 schematically illustrates mitigation of drive-line induced vibration in accordance with embodiments of the present disclosure.

FIGS. 2 and 2A depict a vehicle control system 200 for a vehicle within which mitigation of drive-line induced vibration is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a motor control CAN 205 to which a sensor ECU 206 and a traction motor ECU 207 are connected. The sensor ECU 206 measures motor speed, while the traction motor 207 controls motor speed and/or torque. The vehicle control system 200 in FIG. 2 also includes a user interface (UI) CAN 208 to which a "dashboard" ECU 209, a touchscreen ECU 210, and an accelerator ECU 211 are connected. The UI CAN 208 and the associated ECUs 209, 210, and 211 allow the operator to set relevant operating parameters such as speed, cruise control, and/or following distance.

FIG. 2A illustrates a high level block diagram for the architecture 250 of each CAN depicted in FIG. 2. Each CAN shown in FIG. 2 includes a functional CAN ECU 251 for the specific function performed by the respective CAN (e.g., speed and driving mode control in the case of UI CAN 208). The functional CAN ECU 251 is coupled to a CAN processor/controller 252 that controls the interactions of the respective CAN with the other CANs within the vehicle 100 through the gateway ECU 202. A CAN transceiver 253 receives messages from and transmit messages to other CANs under the control of the CAN processor/controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding the present disclosure is depicted and described. Various changes may be made to the example of FIGS. 2 and 2A, and the improved lateral acceleration control described in this disclosure may be used with any other suitable vehicle control system.

FIG. 3 schematically illustrates mitigation of drive-line induced vibration in accordance with embodiments of the present disclosure. The embodiment of the mitigation control 300 illustrated in FIG. 3 is for illustration and explanation only. FIG. 3 does not limit the scope of this disclosure to any particular implementation of a vehicle. Mitigation control 300 is implemented with vehicle 100, in part by motor control CAN 205 operating in conjunction with traction motor 207 and sensor 206.

To mitigate drive-line induced vibration, the oscillation of the drive line can be attenuated by applying a torque with the traction motor 207 that counters the oscillatory component. Sensor 206 measures motor speed at an output of the traction motor 207, separate from any measurement of drive line shaft speed or wheel speed. The motor speed measurement by sensor 206 serves to pick up the drive line induced oscillations. The main challenge is to then isolate the component related to the drive line oscillation component from other components in the measured motor speed signal, which is done by applying filter(s) 301 to the speed signal. The tuning of the filter 301 is based on knowledge of the natural frequency of the drive-line, with the goal of extracting the oscillation signature from the signal with minimal phase shift. One filter combination that achieves this goal well is a bandpass filter and a first order high pass filter.

A determination is made by signal combiner 302 and controller 303 of the torque required to control drive line oscillation to a target (zero). After ensuring limitation of additional torque by signal limiter 304, oscillation mitigation torque is added to driver requested torque command by signal combiner 305. The main components are therefore filters 302 (e.g., a band pass filter) and a controller 303, which may implement a proportional-only or proportional-integral control.

One of the advantages of implementing a mitigation strategy for drive line oscillations on the motor controller is the minimization of lags in the response. Latencies are minimized since the entire response mechanism (inputs and outputs) is contained within the motor controller and does not require information or action from any other ECU on the vehicle.

Figure 4:
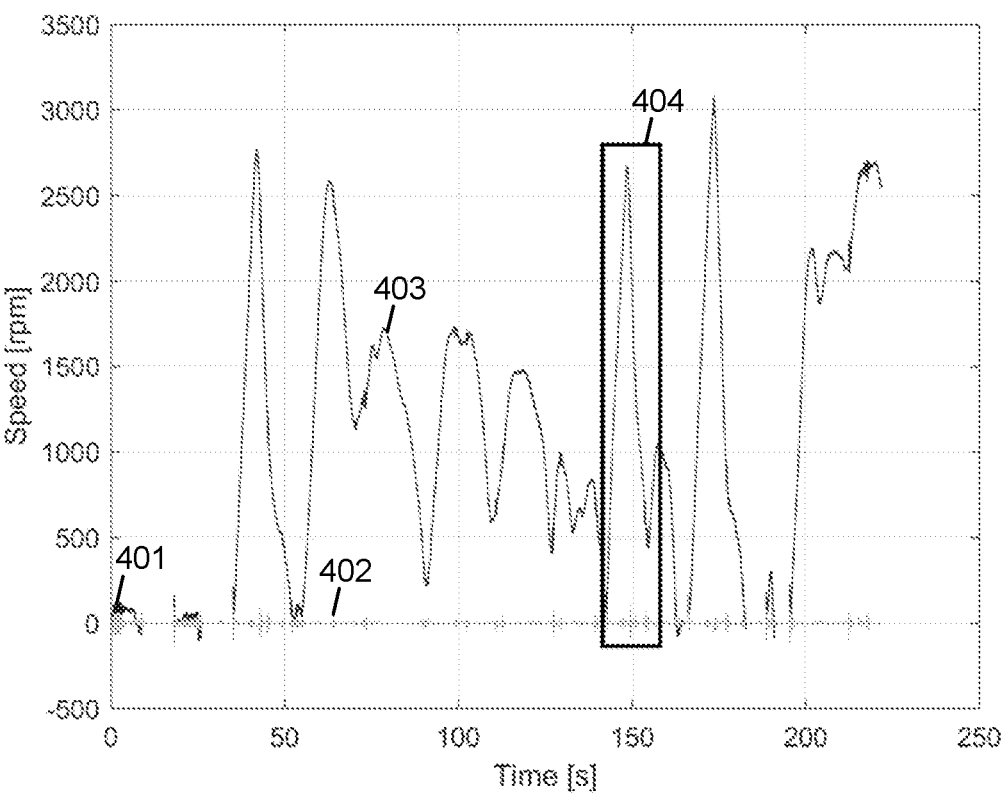
FIGS. 4, 4A, and 4B depict drive line induced motor speed oscillations.
Figure 4A:
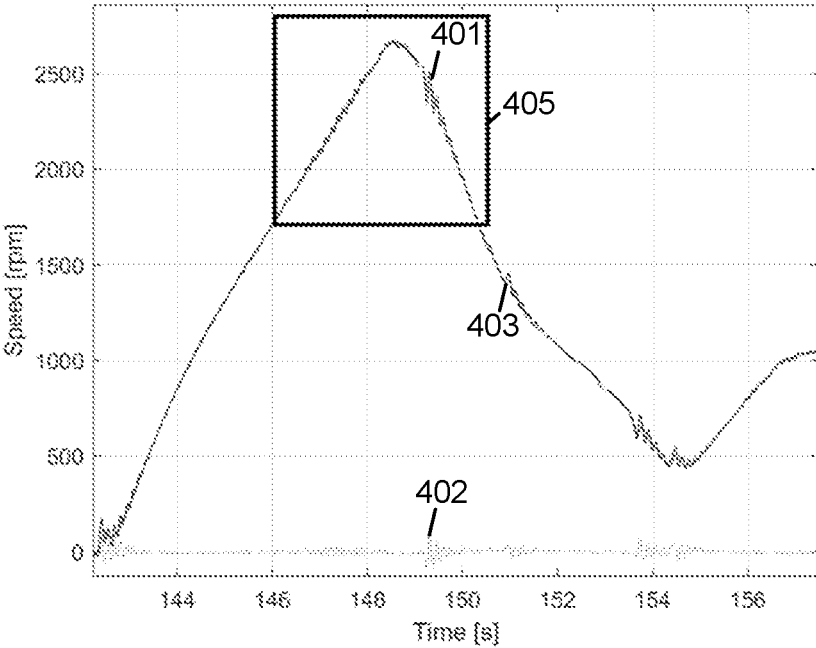
Figure 4B:
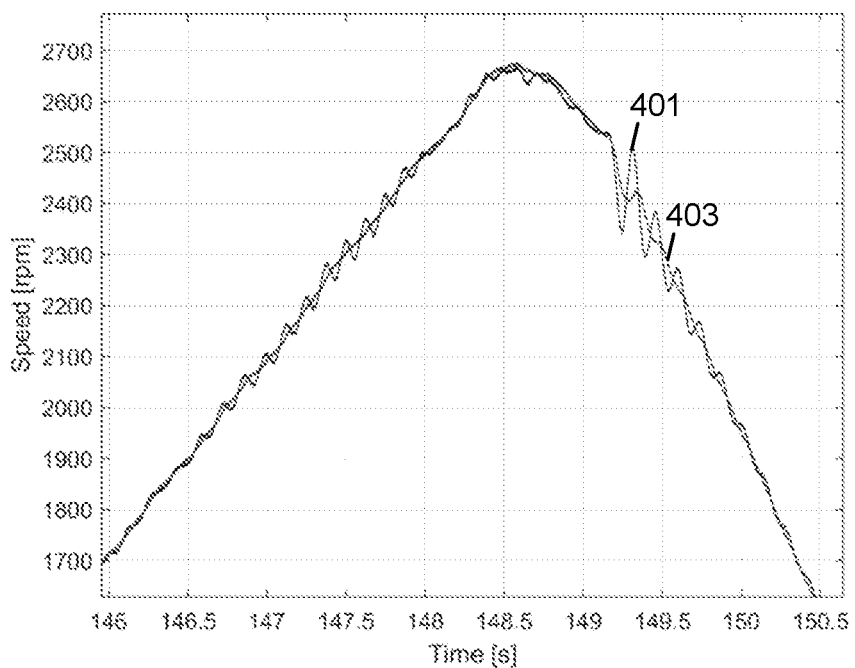

FIGS. 4, 4A, and 4B depict drive line induced motor speed oscillations. FIG. 4 illustrates speed as a function of time, depicting speed 401 measured by sensor 206, the output 402 of filter(s) 301, and the difference 403 between speed 401 and output 402. FIG. 4A is an enlargement of area 404 in FIG. 4, and FIG. 4B is an enlargement of area 405 in FIG. 4B.

Figure 5:
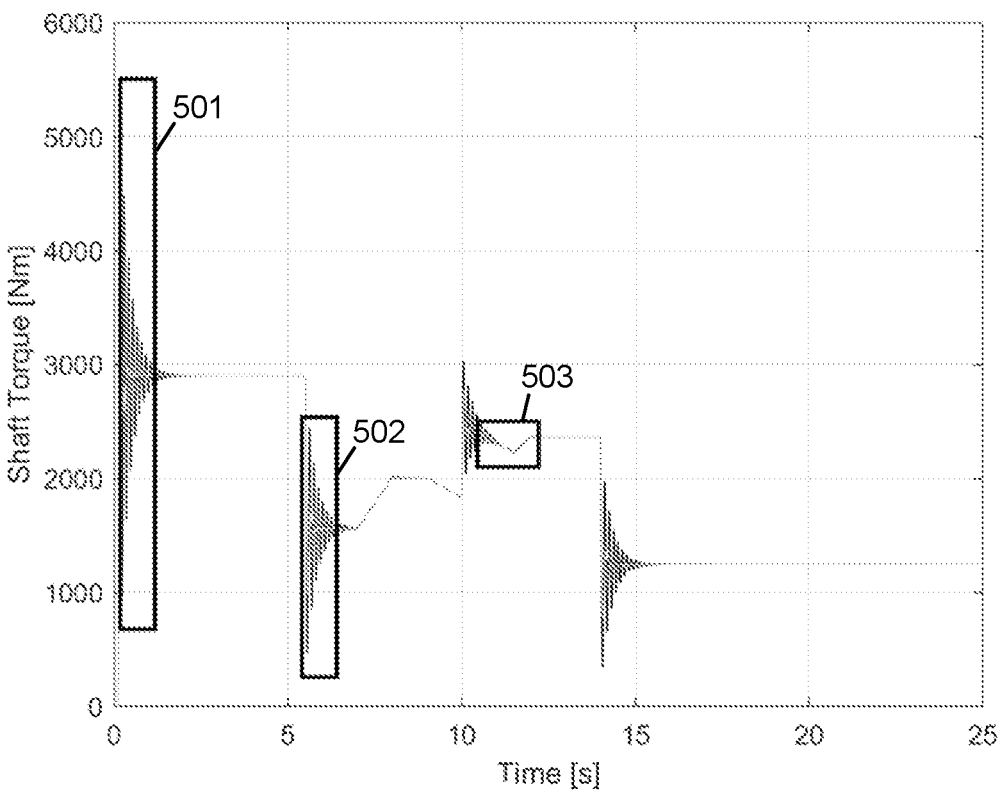
FIGS. 5, 5A, 5B, and 5C depict dampening of drive line induced motor speed oscillations in accordance with embodiments of the present disclosure.
Figure 5A:
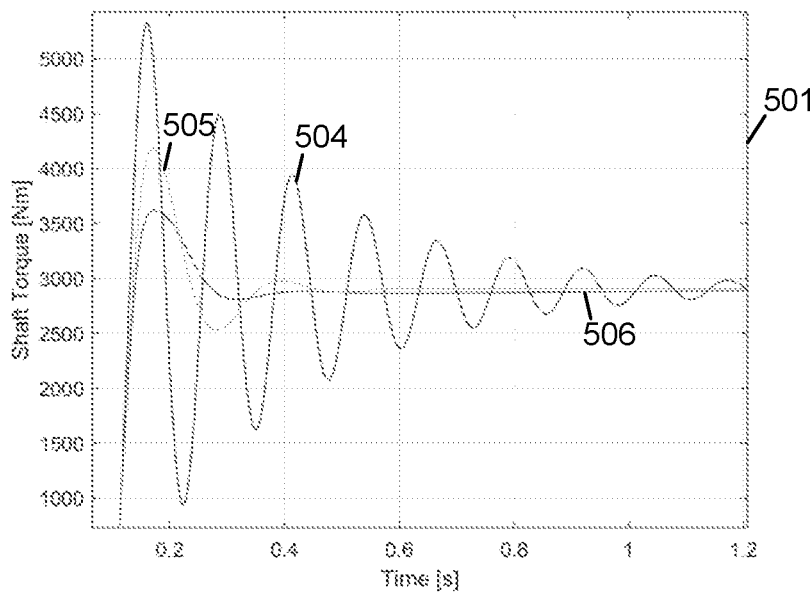
Figure 5B:
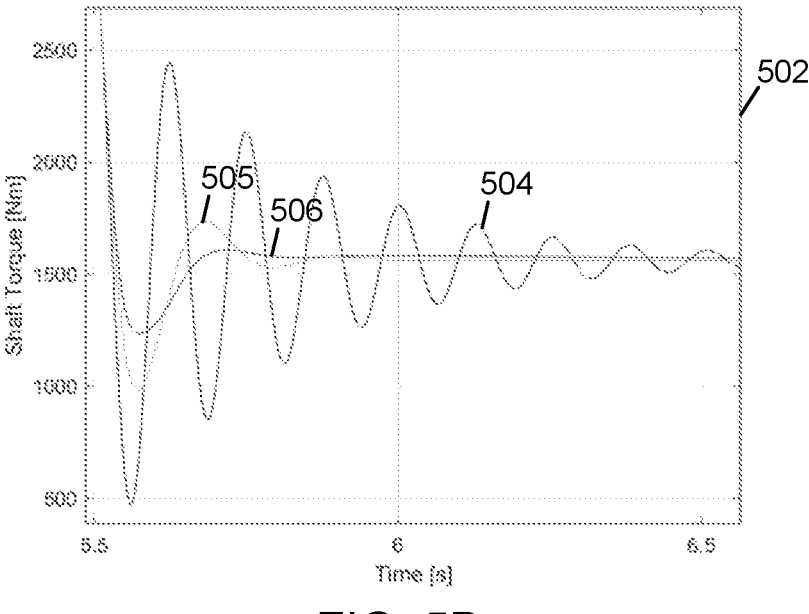
Figure 5C:
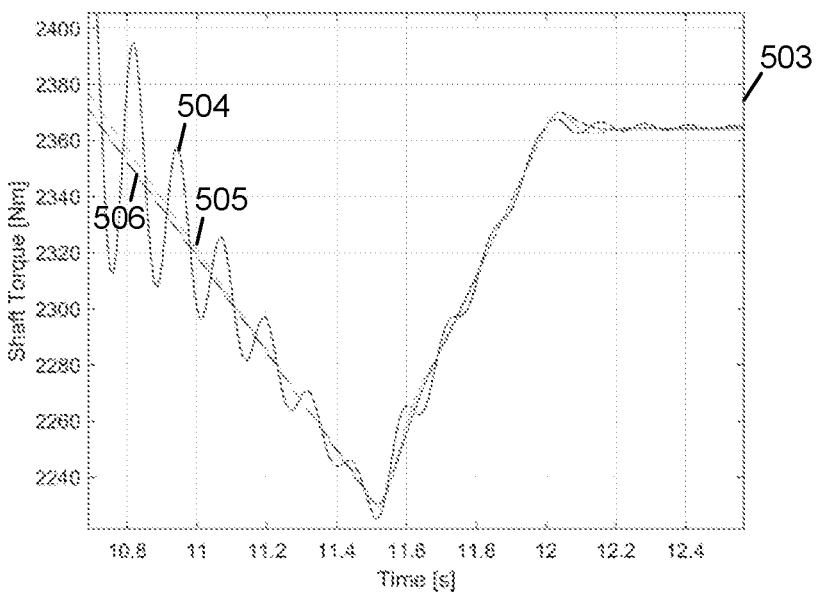

FIGS. 5, 5A, 5B, and 5C depict dampening of drive line induced motor speed oscillations in accordance with embodiments of the present disclosure. FIG. 6 illustrates drive shaft torque in Newton-meters (Nm) as a function of time. FIG. 5A is an enlargement of area 501 in FIG. 5; FIG. 5B is an enlargement of area 502; and FIG. 5C is an enlargement of are 503. Signal 504 represents shaft torque without dampening; signal 505 represents shaft torque with proportional-only (P) control; and signal 506 represents shaft torque with proportional-integral (PI) control. As apparent, both P control and PI control significantly dampen oscillations in shaft torque.

Drive line judder manifests in particular during wide open throttle acceleration (e.g., from 3000 revolutions per minute (rpm) to 5000 rpm) or hard braking between 30 miles per hour (mph) and 40 mph (e.g., from 5000 rpm to 3000 rpm). The judder manifests in oscillations of the drive line at a natural frequency. The natural frequency of an exemplary vehicle is approximately 8 Hertz (Hz), and is commonly in the range of 6-10 Hz for electric vehicle powertrains. Reducing or eliminating the oscillation will reduce or eliminate the judder felt in the cabin.

Interventions by mitigation control 300 are brief, with a magnitude of the torque correction is largely well below typical 10 Nm motor torque, such that no meaningful impact on performance results from the magnitude and duration of the intervention. On average, the cumulative damping torque (oscillation mitigation trq) is close to zero, since the component is purely an alternating current (AC) component. Addition of the integral term Ki to the proportional term Kp—that is, proportional-integral control rather than proportional-only control—does not appear to yield marked improvement.

FIG. 6 is a high level flowchart for a process of mitigating drive line induced vehicle vibration in accordance with embodiments of the present disclosure. The embodiment of the process 600 illustrated in FIG. 6 is for illustration and explanation only. FIG. 6 does not limit the scope of this disclosure to any particular implementation of a mitigation process.

The process 600 begins with measuring motor speed at an output of a motor, separately from any measurement of drive shaft speed or wheel speed (step 601). Filtering of the measured motor speed is performed to detect an oscillation signal corresponding to drive line induced oscillations in the motor speed (step 602). One of a proportional or proportional-integral control is applied to a signal based on the detected oscillation signal, to derive an output corresponding to a desired dampening of the drive line induced oscillations in motor speed (step 603). An oscillation mitigation torque signal is provided based on the desired dampening of the drive line induced oscillations in motor speed (step 604). The oscillation mitigation torque signal is added to a torque command for desired motor speed, to generate an adjusted torque command (step 605). The motor is controlled based on the adjusted torque command (step 606).

The present disclosure provides a simple, potentially software-based solution to mitigate drive-line oscillations and improve driving feel. When implemented with the programming of an existing electric motor controller for an electric vehicle, no cost for additional parts is incurred.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method for controlling drive line oscillation for a motor of a vehicle having a vehicle data bus, the method comprising:
  measuring, using a sensor coupled to the vehicle data bus, motor speed at an output of the motor;
  filtering, using at least one filter, the measured motor speed to detect an oscillation signal corresponding to drive line induced oscillations in the motor speed;
  combining, using a first signal combiner, the oscillation signal of the at least one filter and a target drive line oscillation,
  using a motor controller coupled to an output of the first signal combiner to control a signal based on the detected oscillation signal, and derive an output corresponding to a desired dampening of the drive line induced oscillations in motor speed;
  providing, using the motor controller, an oscillation mitigation torque signal based on the desired dampening of the drive line induced oscillations in motor speed;
  adding, using a second signal combiner, the oscillation mitigation torque signal to a torque command for desired motor speed, to generate an adjusted torque command; and
  controlling the motor based on the adjusted torque command;
  the at least one filter, the first signal combiner, the motor controller, and the second signal combiner defining a motor control network coupled to the vehicle data bus.

2. The method according to claim 1, wherein using the motor controller comprises using the motor controller to apply one of a proportional and proportional-integral control to the signal.

3. The method according to claim 1, further comprising limiting the output corresponding to the desired dampening of the drive line induced oscillations in motor speed, to generate the oscillation mitigation torque signal.

4. The method according to claim 1, wherein measurement of the motor speed at the output of the motor is separate from any measurement of shaft speed or wheel speed.

5. The method according to claim 1, wherein filtering the measured motor speed comprises filtering the measured motor speed using a bandpass filter having a pass band based on a natural drive shaft resonance frequency.

6. The method according to claim 5, wherein the pass band for the bandpass filter is based on 8 Hertz.

7. The method according to claim 1, wherein filtering the measured motor speed further comprises filtering the measured motor speed using a high pass filter.

8. The method according to claim 1, wherein providing the oscillation mitigation torque comprises providing the oscillation mitigation torque based upon subtracting the oscillation signal from the target drive line oscillation.

9. The method according to claim 8, wherein the target drive line oscillation is zero.

10. The method according to claim 1, wherein the motor comprises an electric motor.

11. A motor control system for a motor of a vehicle having a vehicle data bus, the motor control system comprising:
  a sensor coupled to the vehicle data bus and configured to measure motor speed at an output of the motor;
  at least one filter coupled to the sensor and configured to filter the measured motor speed to detect an oscillation signal corresponding to drive line induced oscillations in the motor speed;
  a first signal combiner configured to combine the oscillation signal and a target drive line oscillation;
  a torque controller coupled to the first signal combiner and configured to cooperate therewith to
    control a signal based on the detected oscillation signal, and
    derive an output corresponding to a desired dampening of the drive line induced oscillations in motor speed; and
  a second signal combiner coupled to the output of the torque controller and configured to
    receive an oscillation mitigation torque signal from the torque controller based on the desired dampening of the drive line induced oscillations in motor speed,
    add the oscillation mitigation torque signal to a torque command for desired motor speed, to generate an adjusted torque command, and
    generate a control signal for controlling the motor based on the adjusted torque command;
  the at least one filter, the first signal combiner, the torque controller, and the second signal combiner defining a motor control network coupled to the vehicle data bus.

12. The system according to claim 11, wherein the torque controller is configured to apply one of a proportional and proportional-integral control to the signal based on the detected oscillation signal.

13. The system according to claim 11, further comprising a limiter configured to limit the output corresponding to the desired dampening of the drive line induced oscillations in motor speed, to generate the oscillation mitigation torque signal.

14. The system according to claim 11, wherein measurement of the motor speed at the output of the motor is separate from any measurement of shaft speed or wheel speed.

15. The system according to claim 11, wherein the at least one filter comprises a bandpass filter having a pass band based on a natural drive shaft resonance frequency.

16. The system according to claim 15, wherein the pass band for the bandpass filter is based on 8 Hertz.

17. The system according to claim 11, wherein the at least one filter further comprises a high pass filter.

18. The system according to claim 11, wherein the torque controller is configured to generate the oscillation mitigation torque signal based upon subtracting the oscillation signal from the target drive line oscillation.

19. The system according to claim 18, wherein the target drive line oscillation is zero.

20. The system according to claim 11, wherein the motor comprises an electric motor.

* * * * *